United States Patent
Moision et al.

(10) Patent No.: US 10,291,365 B2
(45) Date of Patent: May 14, 2019

(54) EFFICIENT AUTOMATIC REPEAT REQUEST FOR FREE SPACE OPTICAL COMMUNICATION

(71) Applicant: X Development LLC, Mountain View, CA (US)

(72) Inventors: Bruce Moision, Palo Alto, CA (US); Edward Keyes, Mountain View, CA (US); Oliver Bowen, Redwood City, CA (US); Devin Brinkley, Redwood City, CA (US); Baris Erkmen, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 288 days.

(21) Appl. No.: 15/393,377

(22) Filed: Dec. 29, 2016

(65) Prior Publication Data

US 2018/0191431 A1 Jul. 5, 2018

(51) Int. Cl.
*H04B 10/00* (2013.01)
*H04L 1/18* (2006.01)
*H04B 10/112* (2013.01)

(52) U.S. Cl.
CPC ........ *H04L 1/1864* (2013.01); *H04B 10/1123* (2013.01); *H04L 1/187* (2013.01);
(Continued)

(58) Field of Classification Search
CPC .............. H04B 10/112; H04B 10/1121; H04B 10/1123; H04B 10/1125; H04B 10/1127;
(Continued)

(56) References Cited

U.S. PATENT DOCUMENTS 5,754,754 A 5/1998 Dudley et al.
8,989,586 B2 3/2015 Arnold et al.
(Continued)

OTHER PUBLICATIONS

SA3: "LS on MAC, RLC and RRC layer security", 3GPP Draft; S3-060565, 3rd Generation Partnership Project (3GPP), Mobile Competence Centre ; 650, Route Des Lucioles ; F-06921 Sophia-Antipolis Cedex; France, vol. RAN WG2, No. Tall inn; Aug. 21, 2006, Aug. 21, 2006 (Aug. 21, 2006), XP050132267, [retrieved on Aug. 21, 2006].
(Continued)

*Primary Examiner* — Hanh Phan
(74) *Attorney, Agent, or Firm* — Botos Churchill IP Law

(57) ABSTRACT

Aspects of the disclosure provide techniques for automatic repeat request (ARQ) in a free-space optical communication (FSOC) architecture. These techniques, including block-selective ARQ, adaptive retransmission delay, and random seed scrambling, can be used individually or in combination to combat problems involving frame loss or corruption. These techniques enable the system to rapidly recover by streamlining the retransmission process. For instance, block-selective ARQ acknowledges variable length blocks of frames in the return stream from the receiver to the transmitter. Adaptive retransmission delay allows the retransmission delay to grow in the absence of feedback by the receiver, up to some defined limit. And with random seed sampling, a scrambling sequence is incorporated to aid with frame syncing, which avoids the need for a line code. These aspects of the technology provide a robust communication process, and also reduce overhead costs associated with unnecessary retransmissions.

10 Claims, 11 Drawing Sheets

(52) U.S. Cl.
CPC ............ *H04L 1/188* (2013.01); *H04L 1/1809* (2013.01); *H04L 1/1841* (2013.01); *H04L 1/1874* (2013.01)

(58) Field of Classification Search
CPC .............. H04B 10/1129; H04B 10/114; H04B 10/1143; H04B 10/1149; H04B 10/116; H04B 10/118; H04B 10/0795; H04B 10/0793; H04B 10/0775
USPC ....... 398/118, 119, 121, 122, 123, 124, 127, 398/128, 139, 130, 131, 135, 136, 33, 38, 398/25, 26, 27, 137, 138, 172
See application file for complete search history.

(56) References Cited

U.S. PATENT DOCUMENTS

| | | | |
|---|---|---|---|
| 9,021,327 B2 | 4/2015 | Peach et al. | |
| 9,432,151 B2* | 8/2016 | Jeong | H04L 1/1887 |
| 2005/0276608 A1 | 12/2005 | Pavelchek | |
| 2015/0215041 A1* | 7/2015 | Pechner | H04B 10/1123 398/130 |

OTHER PUBLICATIONS

LG Electronics Inc: "UE based flow control in LWA", 3GPP Draft; R2-156380 UE Based Flow Control in LWA, 3rd Generation Partnership Project (3GPP), Mobile Competence Centre; 650, Route Des Lucioles ; F-06921 Sophia-Antipolis Cedex ; France, vol. RAN WG2, No. Anaheim, USA; Nov. 16, 2015-Nov. 20, 2015 Nov. 16, 2015 (Nov. 16, 2015),XP051040376, Retrieved from the Internet: URL:http://www.3gpp.orgjftp/Meetings_3GPP_SYNC/RAN2/Docs/ [retrieved on Nov. 16, 2015].
International Search Report and Written Opinion for PCT Application No. PCT/US2017/067919, dated Jul. 4, 2018. 26 pages.
Lin et al., Error Control Coding: Fundamentals and Applications, Prentice Hall, Inc. Englewood Cliffs, New Jersey, 1983, 45 pages.
Prakash Geetha et al: "On the Improved Performance of Luby Transform Codes over Selective Repeat ARQ in Turbulent Free Space Optical Links." 2013 IEEE 16th International Conference on Computational Science and Engineering, IEEE, Dec. 3, 2013 (Dec. 3, 2013), pp. 1195-1200, XP032573201, DOI: 10.1109/CSE.2013.178.
Invitation to Pay Additional Fees; Communication Relating to the Results of the Partial International Search; Provisional Opinion Accompanying the Partial Search Result dated Mar. 22, 2018, for International Application No. PCT/US2017/067919. 18 pages.

* cited by examiner

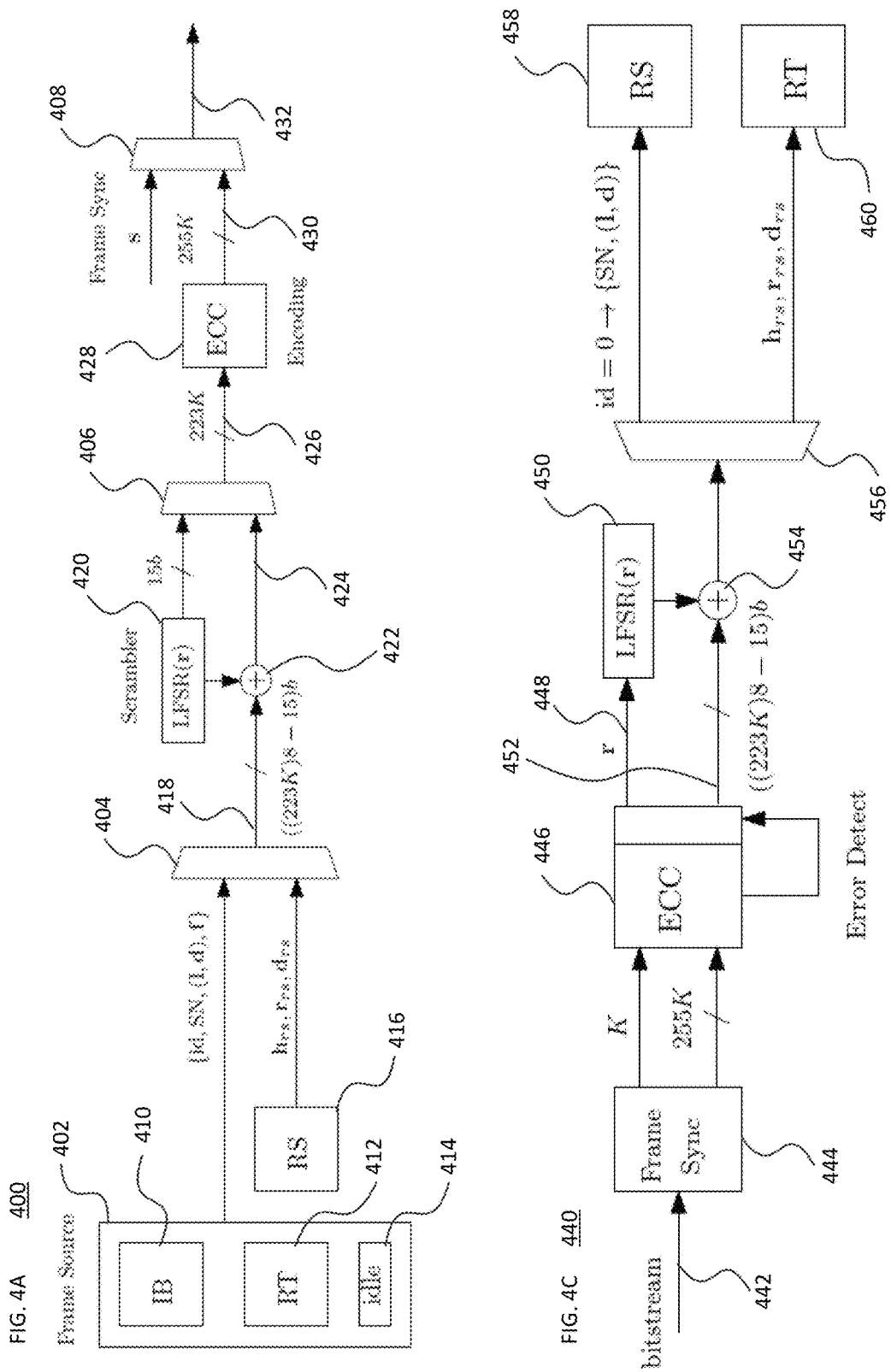

1000

1100

1200

EFFICIENT AUTOMATIC REPEAT REQUEST FOR FREE SPACE OPTICAL COMMUNICATION

BACKGROUND

Communication terminals in a network or other system may transmit and receive optical signals through free space optical links. The optical signals are often sent as data frames. Reliable transmission and receipt of the data frames is necessary for the system to operate properly. Unfortunately, such frames may be lost or damaged in route due to a variety of reasons. One technique to address this problem is to encode the data with an error correction code (ECC) prior to transmission to enable correction of errors in transmission. Another technique is known as automatic repeat request (ARQ), in which the receiver device requests that the transmitter device resend a data frame that was received with an error. However, the free space optical environment is very demanding, and thus advanced techniques may be needed to ensure a reliable data transmission rate without unnecessary retransmissions of data frames.

BRIEF SUMMARY

A number of ARQ-related techniques are provided for use with free-space optical communication (FSOC). These techniques, including block-selective ARQ, adaptive retransmission delay, and random seed scrambling, address a variety of problems involving frame loss or data corruption. The FSOC system is able to handle such problems and recover with a streamlined retransmission process. Block-selective ARQ involves acknowledging variable length blocks of frames in the return stream from the receiver to the transmitter. Applying an adaptive retransmission delay allows the delay to grow in the absence of feedback by the receiver, up to a selected limit. And random seed sampling employs a scrambling sequence to aid with frame syncing.

In accordance with aspects of the disclosure, an automatic repeat request (ARQ) method for use in a free-space optical communication system is provided. The method includes transmitting, by a transmitter device, one or more frames to a receiver device of the free-space optical communication system, and storing, upon transmission, the one or more frames in a retransmission buffer. The method also includes obtaining current state information identifying a current state of a resequencing buffer, tracking a most advanced transmitted frame and an oldest unresolved frame in accordance with the current state information and selecting, by the transmitter device, a frame for transmission according to the tracked most advanced transmitted frame and the oldest unresolved frame. The method further includes retrieving the selected frame from the retransmission buffer and retransmitting the retrieved frame to the receiver device.

In one scenario, obtaining the current state information of the resequencing buffer includes receiving the current state information from the receiver device. Here, the current state information may be received from the receiver device as part of a frame acknowledgement by the receiver device. In another scenario, the current state information includes RS head (hrs), RS received (rrs) and RS delivered (drs) sequence data. And in a further scenario, the most advanced transmitted frame is determined with respect to a frame sequence number.

In accordance with aspects of the disclosure, an automatic repeat request (ARQ) method is provided for use in a free-space optical communication system. The method includes transmitting, by a transmitter device, one or more frames to a receiver device of the free-space optical communication system, and storing, upon transmission, the one or more frames in a retransmission buffer. The method also includes associating a frame state, a time of transmission, and a sequence number with each respective frame stored in the retransmission buffer. The method further includes determining, by the transmission device, whether to retransmit a given one of the one or more frames stored in the retransmission buffer by evaluating whether a time since a last transmission exceeds a loss time $T_{lost}$. This is done according to the equation:

$$T_{lost}(t) = \min\{RTT + (t-t'), T_{lost,max}\}$$

Here, t is a current time, t' is a time at which a last feedback frame was correctly received by the transmitter device, and RTT is an estimated round trip time. And upon determination that $T_{lost}$ has been exceeded, the method includes selecting a given one of the frames stored in the retransmission buffer and retransmitting the selected frame to the receiver device.

In one scenario, selection of the given frame is performed according to at least one of the frame state, the time of transmission and the sequence number. In another scenario, selection of the given frame is limited to unresolved frames stored within the retransmission buffer. In a further scenario, the unresolved frames are limited to frames between an oldest unresolved frame and a most advanced transmitted frame. According to one example, the RTT may be no greater than 2.0 ms. And according to another example, $T_{lost}$ is between the RTT and 20 ms.

In accordance with other aspects of the disclosure, a data transmission method for use with a free-space optical communication system is provided. The method includes selecting, by a processing element, a data frame for transmission to a receiver device and prepending a current state of a resequencing buffer to the data frame to form an information block. The method also includes scrambling the information block with a scrambling sequence to generate scrambled data, applying an error correction code to the scrambled data to obtain a frame, and transmitting, by a transmitter device, the frame to a receiver device of the free-space optical communication system.

In one scenario, the transmission method does not implement a line code for transmission of the frame. In another scenario, the scrambling sequence changes for scrambling of subsequent information blocks. In a further scenario, the scrambling sequence is generated using a predetermined feedback polynomial. Here, the predetermined feedback polynomial may be formed using a linear feedback shift register. According to another scenario, the scrambling sequence is not stored by the transmitter device.

And in yet another scenario, the method further includes determining that the frame was not properly received by the receiver device, selecting the data frame for retransmission to the receiver device, prepending the current state of the resequencing buffer to the data frame to form the information block, scrambling the information block with a new scrambling sequence to generate new scrambled data, applying an error correction code to the new scrambled data to obtain a retransmission frame, and transmitting, by the transmitter device, the retransmission frame to the receiver device.

In accordance with aspects of the disclosure, an automatic repeat request (ARQ) communication device is provided. The ARQ communication device includes an optics system configured to communicate with another communication device using free space optical communication (FSOC). It also includes a transmitter device operatively coupled to the optics system, which is configured to assemble frames to be sent via FSOC by the optics system to the other communication device. A receiver device is operatively coupled to the optics system, and the receiver device is configured to disassemble frames received by the optics system from the other communication device. Memory of the ARQ communication device includes an input buffer (IB), a retransmission buffer (RT) and a resequencing buffer (RS). The ARQ communication device also includes one or more processors operatively coupled to the memory, the transmitter device, the receiver device and the optics system. The one or more processors are configured to select frame data from the IB or the RT and provide the selected frame data to the transmitter device to assemble into one or more frames. A set of previously transmitted frames is stored in the RT. The one or more processors are further configured to track current state information of the set of previously transmitted frames, determine whether the current state information satisfied a threshold condition, and, when the current state information satisfies the threshold condition, retrieve a particular set of frame data from the RT, provide the particular set of frame data to the transmitter device, and to cause the optics system to transmit a frame corresponding to the particular set of frame data to the other communication device.

In one scenario, the current state information includes either a status of a resequencing buffer of the other communication device or a loss time $T_{lost}$. Here, the ARQ communication device may be further configured to track a most advanced transmitted frame and an oldest unresolved frame in accordance with the current state information, and retrieve the particular set of frame data from the RT according to the tracked most advanced transmitted frame and the oldest unresolved frame.

The one or more processors may be configured to determine whether the current state information satisfied the threshold condition by evaluating whether a time since a last transmission exceeds the loss time $T_{lost}$ according to the equation:

$$T_{lost}(t)=\min\{RTT+(t-t'),T_{lost,max}\}$$

Here, t is a current time, t' is a time at which a last feedback frame was correctly received by the transmitter device, and RTT is an estimated round trip time.

According to another scenario, the transmitter device is further configured to apply a scrambling sequence to the selected frame data during frame assembly. In this case, the transmitter device may be configured to apply the scrambling sequence by prepending a current state of a given resequencing buffer to the selected frame data to form an information block, scramble the information block with the scrambling sequence to generate scrambled data, and applying an error correction code to the scrambled data to obtain scrambled frame.

BRIEF DESCRIPTION OF THE DRAWINGS

FIGS. 4A-C illustrate example transmitter and receiver modules and an example frame format in accordance with aspects of the disclosure.

DETAILED DESCRIPTION

Overview

The technology relates to a variety of FSOC-related techniques for use, by way of example, in a free-space optical communication system. In an FSOC system, it is possible to lose data frames individually and in bursts for various reasons. For instance, there may be a pointing error in which the optical link between the transmitter device and the receiver device is lost. Other causes of received power fluctuations, such as scintillation, coupling losses, and other issues may also contribute to the loss of frames in bursts. The techniques described herein enable the system to quickly and efficiently recover from the loss or corruption of data frames by streamlining the retransmission process. This makes the overall communication process more robust, and also reduces overhead costs associated with unnecessary retransmissions.

Example Systems

As indicated above, a communication network or other system may include optical communication links that are used to transfer data between various communication devices. The communication devices may be positioned on buildings, on the ground, or on moving devices (e.g., gimballed devices arranged on high-altitude platforms or satellites), although other structures in which to position communication devices are also envisioned. As such, the communication links are used to transfer the data between the buildings, the ground, and the moving devices. Each optical link allows for communication between two communication devices. A transmitter device is configured to transmit an optical beam, while a receiver device is configured to detect the optical beam from the transmitter device and thus form the communication link. Of course, communication devices may function as transmitter and/or receiver devices at any given point in time.

Figure 1:
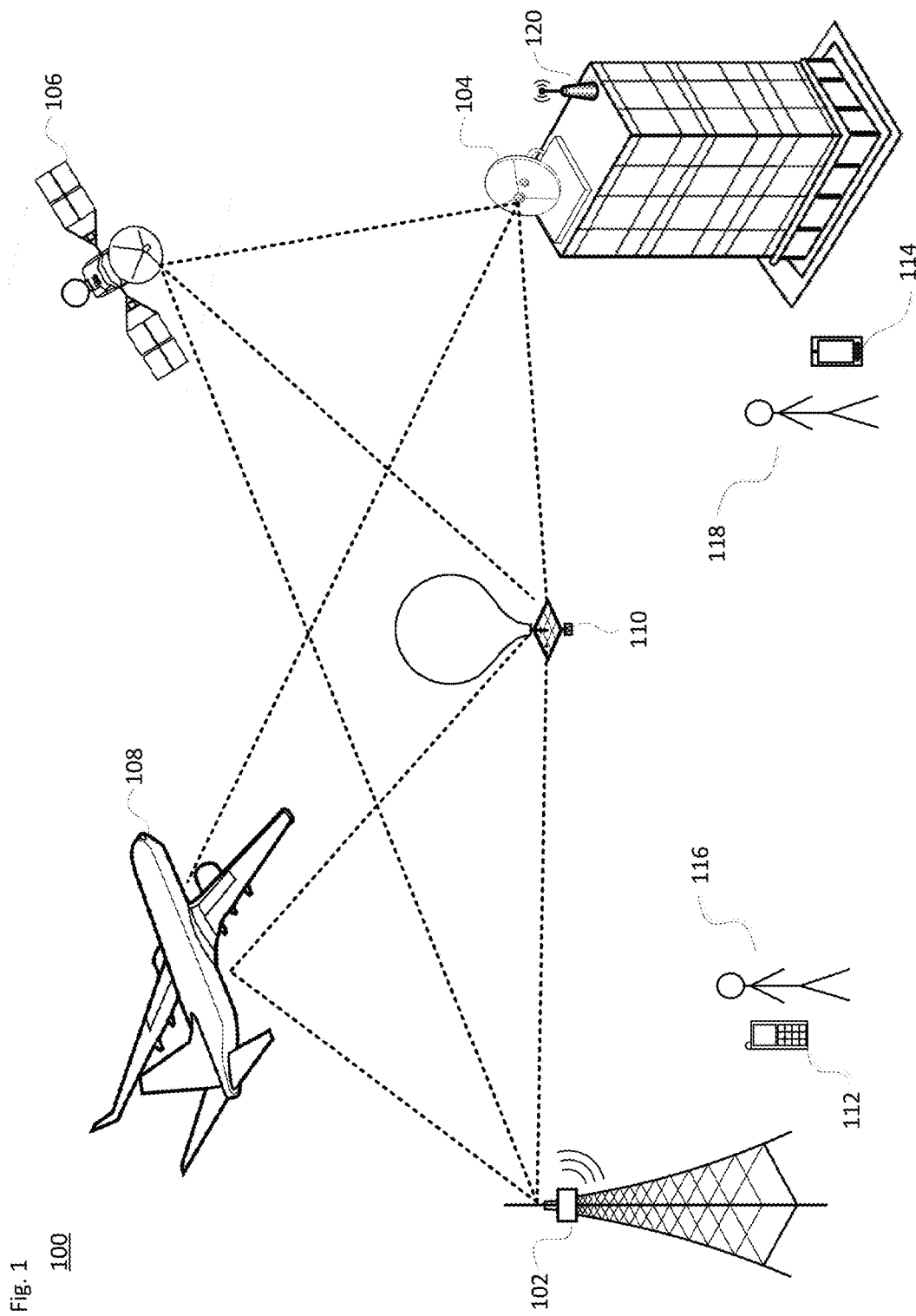
FIG. 1 is a pictorial diagram of an example communication network in accordance with aspects of the disclosure.

Referring to FIG. 1, an example communication network 100 includes a variety of communication terminals such as stationary communication terminals 102 and 104, satellite 106, and high-altitude platforms (HAPs), such as an aircraft that may be an airplane or unmanned aerial vehicle (UAV) 108, as well as a communication balloon 110. One or more communication devices are associated with each communication terminal. The communication devices of the various communication terminals may communicate directly or indirectly with one another. The stationary communication terminals may be located on the rooftop of buildings or on the ground, although other locations are envisioned. The aircraft 108 may be a UAV or other aircraft without a human pilot onboard. The UAV may be autonomous, remotely piloted, or both. The communication balloon 110 may be released into the Earth's stratosphere, for instance to attain an altitude between 11 to 23 miles above the Earth's surface and provide connectivity for a ground area of 25 miles in diameter at speeds comparable to terrestrial wireless data services (such as, 3G or 4G). The communication balloons 110 may float in the stratosphere, in one example at an altitude twice as high as commercial airplanes and the weather (e.g., on the order of 20 km above the Earth's surface). The communication balloons 110 are carried around the earth by winds and can be steered by rising or descending to an altitude with winds moving in the desired direction. Winds in the stratosphere are usually steady and move slowly at about 5 and 20 mph, and each layer of wind varies in direction and magnitude.

The stationary communication terminals 102, 104 may receive communication signals (shown as dotted lines in FIG. 1) from another stationary terminal (not shown), satellite 106, or HAP 108, and reroute the communication signal to another stationary terminal, satellite, or HAP. The HAPs 108 and/or other communication terminals 102, 104, 106 and 110 may be arranged in a mesh network or other configuration to provide communication services to an area of interest. In some examples, the communication signals may be sent directly or indirectly from at least one communication terminal to one or more user devices 112 or 114, each of which may be associated with a user 116 or 118, respectively. For instance, the user device 112 may be a mobile phone in communication with communication terminal 102, for example via cellular communication. And the user device 114 may be in communication with communication terminal 104, for example via a WiFi hotspot 120.

The satellite 106 may be in Low Earth Orbit (LEO), Medium Earth Orbit (MEO), or High Earth Orbit (HEO), including Geosynchronous Earth Orbit (GEO). The HAPs 108 may operate at high altitudes (e.g., 17-22 km above the Earth's surface). In one example, the communication balloon 110 or UAV 108 may be configured to operate in the stratosphere to provide communication services to an area of interest. Such HAPs 108 may be released into the Earth's atmosphere, e.g., by launching from the ground, from an aircraft, or flown to the desired altitude.

In one particular example of the present disclosure, the communication network 100 employs FSOC, which is an optical communication technology that uses light propagating in free space to wirelessly transmit data for telecommunication or computer networking. Therefore, the communication network 100 is configured to transmit optical communication signals between pairs of the communication terminals as shown in FIG. 1.

Figure 2:
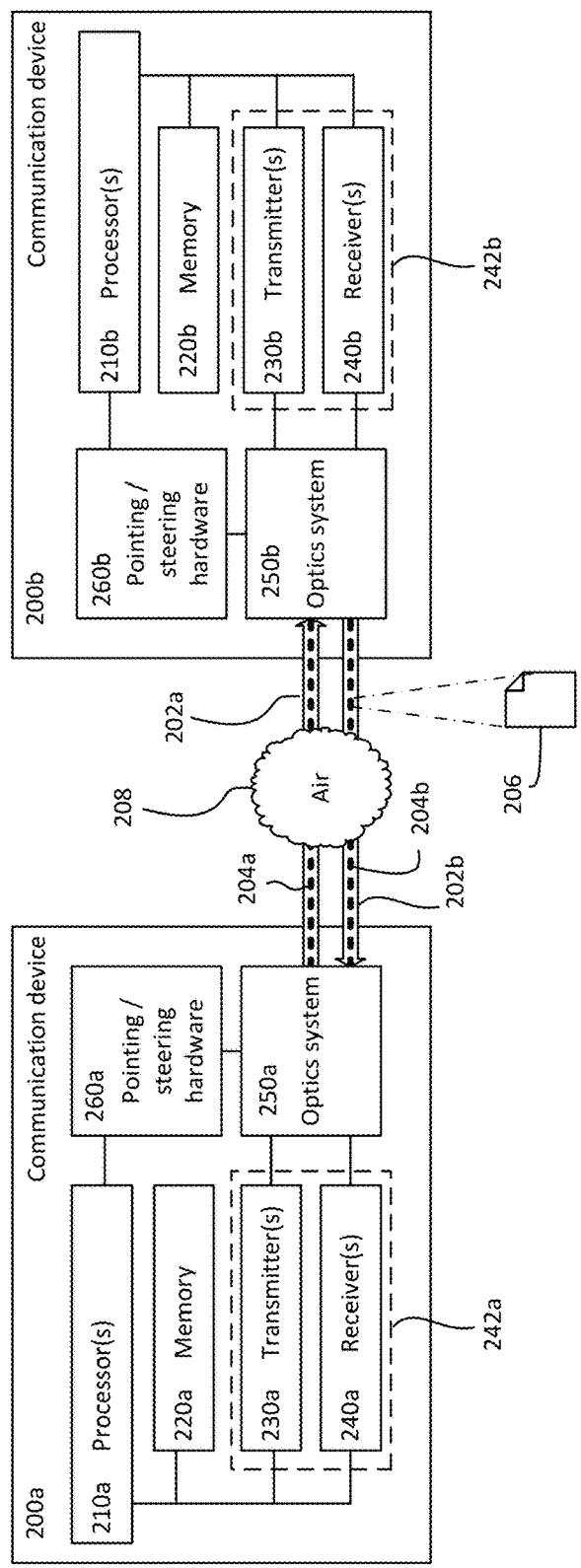
FIG. 2 is a block diagram of a pair of communication devices in accordance with aspects of the disclosure.

Referring to FIG. 2, this figure is a block diagram that illustrates an example pair of communication devices 200a and 200b. As noted above, one or more communication devices are included in each of the communication terminals that employ FSOC. The communication devices 200a, 200b may be configured to establish optical communication links 202a and 202b between two communication terminals, allowing communication signals 204a and 204b to be transmitted from one communication terminal another.

The communication signals 204 include data 206, such as Internet protocol (IP) packets, being routed via free space 208 across the communication network 100 (see FIG. 1). Each communication device 200 (e.g., 200a, 200b) may include one or more processors 210, e.g., 210a or 210b and memory 220, e.g., 220a or 220b. The communication devices also include one or more transmitter devices 230, e.g., 230a or 230b and receiver devices 240, e.g., 240a or 240b, which may be arranged as transceivers 242, e.g., 242a and 242b. The communication devices also include an optical system 250, e.g., 250a or 250b, and pointing/steering hardware 260, e.g., 260a or 260b.

The processor(s) 210 may comprise a central processing unit (CPU) or other microprocessor, dedicated field programmable gate array (FPGA) logic, other hardware-based processing components and any combination thereof. The one or more processors 210 are operatively coupled with memory 220 that non-transitorily stores information, such as instructions executable by the one or more processors 210. The memory 220 of each communication device 200 is also configured to store information regarding the data to be transmitted across the free space optical link. The memory 220 may comprise one or more memory modules either physically or logically arranged to include various buffers, which are described in detail below.

The one or more processors 210 are operatively coupled with the transmitter device 230 and the receiver device 240. The one or more processors 210 may therefore be configured to transmit, via the transmitter device(s) 230, communications information and data in the form of optical beams, and also may be configured to receive, via the receiver device(s) 240, communications and data in the form of optical beams. Received optical beams may be processed by the one or more processors 210 to extract the communications information and data.

The one or more processors 210 are further configured, in accordance with the extracted communications information and data, to implement various ARQ techniques. This may include determining whether to retransmit certain unacknowledged frames (e.g., one or more data packets) that are not currently in transit. It may also include adaptively varying a retransmission delay depending upon whether feedback has been provided by the receiver device. And it may further include providing a scrambling sequence to avoid the possibility of false frame markers. These ARQ techniques are discussed in detail below.

The one or more processors 210 are also operatively coupled to the optics system 250 and may determine an adjusted position of the optics system 250 to establish a link 202. Furthermore, the one or more processors 210 are operatively coupled to the pointing/steering hardware 260 for adjusting the optics system 250, and may be configured to provide pointing adjustments of the optics system 250. The pointing/steering hardware 260 may be configured to move in at least two degrees of freedom, such as yaw and pitch. The adjustments to the optics system 250 may be made to establish acquisition and connection links with the other communication device 200.

The transmitter device 230 may be a semi-conductor device, such as a light-emitting diode (LED) or a laser diode. In some examples, the transmitter device 230 may be a fiber laser or a solid state laser. Laser diodes may be directly modulated, that is, the light output may be controlled by a current applied directly to the transmitter 230. The transmitter device 230 may be a single-mode laser diode that supports one optical mode, or the transmitter device 230 may be a multimode laser diode that supports multiple-transverse optical modes. An optical mode is a particular electromagnetic field pattern of radiation measured in a plane perpendicular (i.e., transverse) to the propagation direction of the beam. The transmitter device 230 may receive a modulated communication signal from a modulator (not shown), which in turn receives an electrical signal, and modulates the electrical signal.

The transmitter device 230 may receive the modulated electrical signal, convert the electrical signal into an optical communication beam, and output the optical communication beam into an optical fiber towards the optics system 250. The transmitter device 230 is also configured to output a beacon beam that allows one communication device to locate another. For example, transmitter device 230b of the communication device 200b may output a beacon beam to enable the communication device 200a to locate device 200b and to establish a communication link 202a with the communication device 200b. The transmitter device 230a of the communication device 200a may similarly output a beacon beam to enable communication device 200b to locate device 200a and establish a communication link 202b with the communication device 200a. As such, the communication links 202a, 202b may allow for communication signals 204a and 204b between the two communication devices 200a and 200b.

The receiver device 240 includes a light position sensing device to detect the incoming optical beam. In some examples, the light position sensing device includes, but is not limited to, a lateral position device, a charge-coupled Device (CCD) camera, a photodetector, or a quad-cell, to detect the optical beacon laser. The receiver device 240 converts the received optical beam into an electric signal using the photoelectric effect.

The optics system 250 is configured to transmit the optical beams, such as communication beams or beacon beams, as well as receive the optical beams and provide the received optical beams to the receiver device 240. For receiving optical beams, the optics system 250 and/or the receiver device 240 may include, but are not limited to, a demultiplexer, an optical pre-amplifier, photodiodes, the photoreceiver, transimpedance amplifiers, clock/phase recovery circuits, decision circuits, and/or forward error correction (FEC) circuits.

Configurations of the optics system 250 may include transmitter optics that are separate from receiver optics. As such, communication link 202a may be formed between transmitter optics of one communication device and receiver optics of another communication device. For example, the communication device 200a may form a communication link 202a with the communication device 200b using transmitter optics in optics system 250a of the communication device 200a and receiver optics in optics system 250b of the second communication device 200b. Once the communication link 202a is formed, the one or more processors 210a can send communication signals 204a that include data 206 to the communication device 200b. Similarly, the transmitter optics in optics system 250b at the communication device 200b may transmit an optical beacon beam, which the receiver optics in optics system 250a at the communication device 200a locates and identifies to form a communication link 202b. Once the communication link 202b is formed, the one or more processors 210b can send communication signals 204b that include data 206 to the communication device 200a.

As noted above, the communication devices 200 may be integrated in communication terminals including stationary communication terminals and mobile communication terminals such as HAPs 108. In some examples, the one or more processors 210 in the communication device 200 of communication balloon 110 may be configured to determine a location and/or altitude the high-altitude balloon 110 needs to attain in order to provide appropriate communication coverage, for instance a particular position or station in a mesh network. The one or more processors 210 may further be configured to move the communication balloon 110 into a layer of wind blowing in a direction that may take the balloon where it should be going, thereby steering the communication balloon to the right location.

Figure 3:
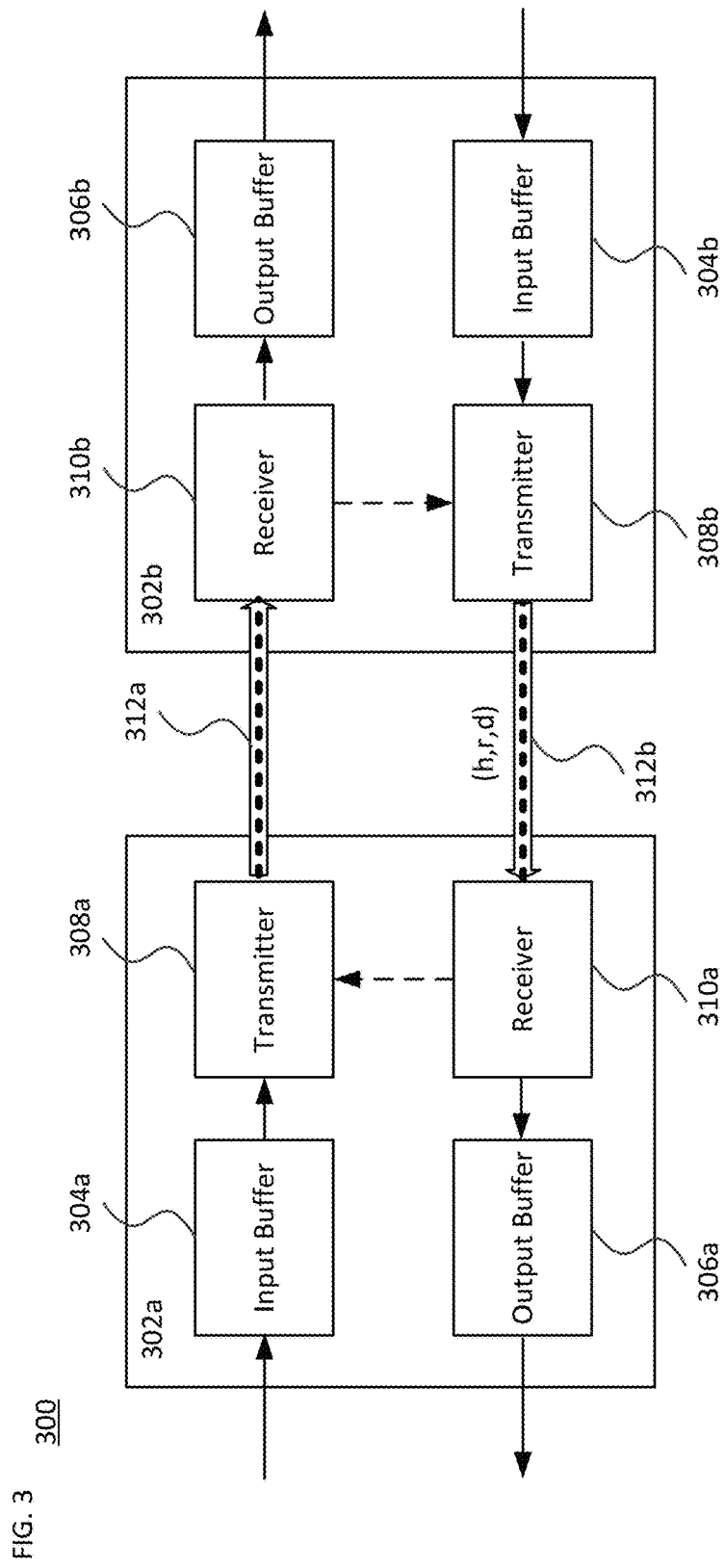
FIG. 3 is functional system diagram of the pair of communication devices of FIG. 2 in accordance with aspects of the disclosure.

Referring to FIG. 3, this figure illustrates an example system 300 including a pair of communication devices 302a and 302b, which correspond functionally to the communication devices 200a and 200b of FIG. 2. As shown, each communication device 302 has an input buffer (IB) 304 (304a or 304b), an output buffer (OB) 306 (306a or 306b), a transmitter section 308 (308a or 308b) and a receiver section 310 (310a or 310b). By way of example, the input buffers 304a and 304b and output buffers 306a and 306b may comprise portions of the memories 220a and 220b, respectively. The transmitter sections 308a and 308b may include transmitter devices 230a and 230b, respectively, as well as corresponding portions of the optics system 350a or 350b. Similarly, the receiver sections 310a and 310b may include the receiver devices 240a and 240b, respectively, as well as corresponding portions of the optics system 350a or 350b.

In the example system 300 of FIG. 3, transmitter 308a of communication device 302a is configured to send data frames to the receiver 310b of communication device 302b via optical communication link 312a. In this particular example, the transmitter 308b of communication device 302b is configured to send acknowledgement frames and other information to the receiver 310a of the communication device 302a via optical communication link 312b. As shown in the figure, the communication device 302b may provide sequence information (h,r,d) to the communication device 302a conveying the current state of a resequencing buffer, so that the processor(s) of communication device 302a can implement certain ARQ techniques as explained in detail below.

Figure 4B:
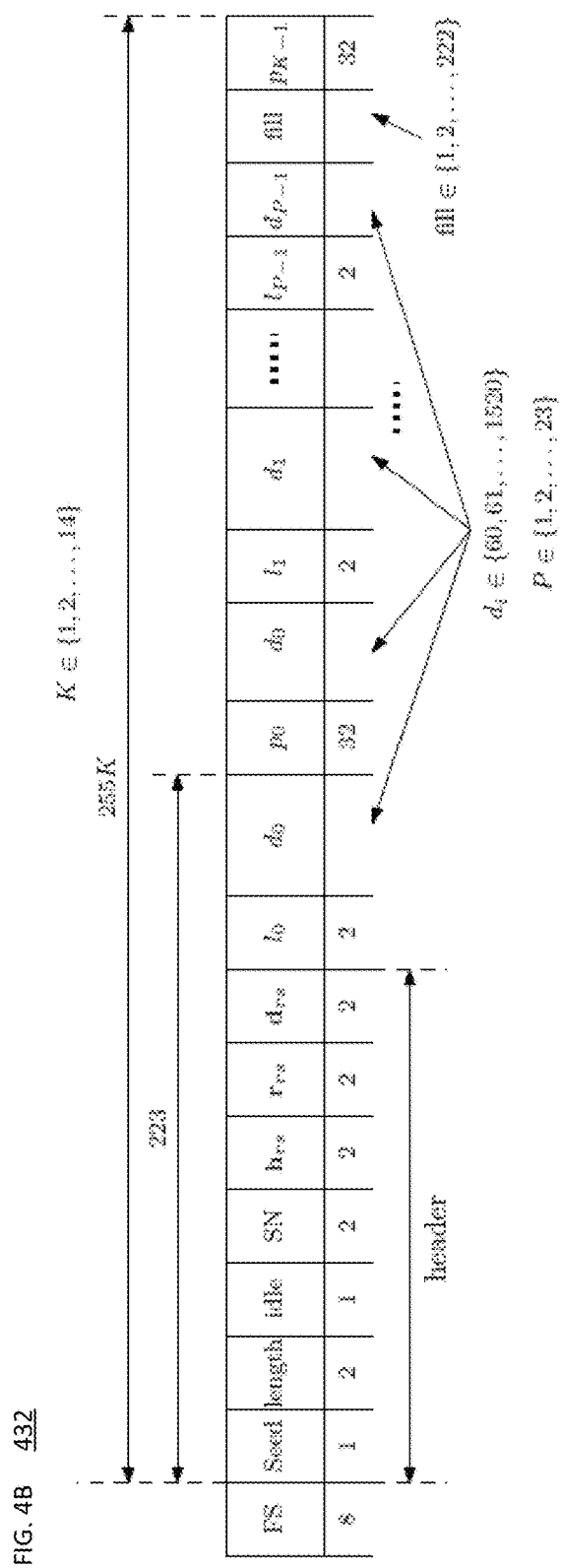

Referring to FIGS. 4A-C, these figures illustrate an example transmitter module 400 and an example receiver module 440 that respectively assemble and disassemble data frames, along with an example frame configuration. The modules implement certain functionality of the transmitters 308a and 308b and receivers 310a and 310b of FIG. 3, and corresponding functionality of the transmitter devices 230a and 230b, and the receiver devices 240a and 240b of FIG. 2. As shown in FIG. 4A, the transmitter module 400 includes a frame source 402 and multiplexer 404, 406 and 408. The frame source 402 includes input buffer 410 and a retransmission buffer (RT) 412. In accordance with aspects of the technology, ARQ logic of the processor(s) can select a frame for transmission from the input buffer 410 or the retransmission buffer 412, or as an idle frame 414. The frame source 402 provides the selected frame to the multiplexer 404, including, e.g., an idle frame flag (id), a sequence number (SN), frame information such as frame length (l) and a frame data field (d), as well as fill bytes (f), as needed.

The multiplexer 404 multiplexes the frame with data from a resequencing buffer (RS) to obtain first multiplexed information 418. This data includes resequencing head information ($h_{rs}$), resequencing received information ($r_{rs}$), and resequencing delivered information ($d_{rs}$), which conveys the current state of the resequencing buffer to the receiver. The $h_{rs}$, $r_{rs}$ and $d_{rs}$ information may comprise sequence numbers. A scrambling sequence supplied by scrambler 420 is applied via node 422 to the first multiplexed information 418, resulting in a scrambled block 424. The scrambler 420 may be a linear feedback shift register (LFSR)-based scrambler. The multiplexer 406 prepends the initial state of the scrambler 420 to the header of the scrambled block 424, resulting in second multiplexed information 426.

The second multiplexed information 426 is encoded with an error correction code, such as a Reed-Solomon ECC at encoding block 428. In one example, the error correction code is an (n; k)=(255, 223) Reed-Solomon code. Here, the encoder computes 32 parity bytes for a block of 223 information bytes, and the codeword length is thus 255 bytes. The multiplexer 408 prepends a frame sync marker (s) to the ECC encoded data 430, forming a frame 432 ready for transmission via FSOC.

Referring to FIG. 4B, this figure illustrates one possible frame format in accordance with aspects of the disclosure. Here, the units are of bytes (8, 1, 32, . . . ), or bits (15b, 1b). FS=frame sync, $l_i$=length field of the ith packet, $d_i$=ith packet (information bytes), f=fill bytes, and $p_i$=parity bytes of ith codeword. Parity bytes are inserted every 223 bytes (exclusive of the parity bytes themselves) according to the ECC. In this example, the minimum frame length is preferably 255 bytes and the maximum frame length is 3570 bytes.

A frame contains P packets. The number of packets is determined by the incoming packet stream and takes values in {1, 2, . . . , 23}. Packets are added to a frame with a 2-byte length field encoding the packet length. The length field of the ith packet is denoted $l_i$ and the $l_i$-byte packet is denoted $d_i$. The collection of packets in a frame is denoted by:

$$(l,d)_P = \{(l_0,d_0),(l_1,d_1), \ldots ,(l_{P-1},d_{P-1})\}$$

In this example, when a continuous stream of packets are available, packets are collected to form a frame until the length fields and packet data exceeds 1480 bytes, i.e., |(l; d)|≥1480. If there is no packet available to extend a frame to 1480 bytes, the frame is considered complete. If there are no packets in the frame, the idle frame flag id in the header is set to 1, and the data field is set to all zeros corresponding to the minimum frame length. A fill byte pattern of all zero bytes are added to each frame such that the frame length with header is a multiple of 223 bytes.

On request of transmission of a frame, as discussed above in accordance with FIG. 4A, in this example the frame {id, (l, d), f} is prepended with the assigned sequence number and the 6-byte current state ($h_{rs}$, $r_{rs}$, $d_{rs}$) of the resequencing buffer. The block is scrambled. The initial 2-byte scrambler state or seed is prepended to the block (the state is not scrambled). Every block of 223 scrambled bytes are encoded by the RS code, producing 32 parity bytes. The 32 parity bytes are inserted after the 223 bytes they encode (parity bytes are not scrambled). The minimum frame length is 255 bytes. With a maximum input packet length of 1520 bytes, the maximum frame length is 3570 bytes.

An equivalent reverse process is employed to decode and descramble the received frame, which is shown in FIG. 4C, which illustrates data processing at the receiver module 440. A frame synchronization module 444 locates the frame sync patterns at the start and end of a frame (bitstream) 442. From this, the frame synchronization module 444 determines K, the number of ECC codewords in the frame. Both K and the encoded data are provided to ECC decoding block 446, which is configured to detect and possibly correct certain errors in the encoded data block. For instance, using the (255, 223) Reed-Solomon code, the decoder can correct up to t=16 byte errors. With probability close to 1, codewords with more than 16 byte errors are detected by the decoder and flagged as unreliable codewords. If any of the K codewords in a frame is flagged as unreliable, the entire frame is discarded. In conjunction with the codewords being decoded, the parity bytes are stripped out by the decoder. Assuming there are no errors or that the errors were correctable, the ECC decoding block extracts and outputs the scrambler seed 448 to descrambler 450, and also outputs the decoded data stream 452 to node 454.

For successfully decoded frames, the scrambler seed is used to initialize the descrambler 450, which then descrambles the frame at node 454. This information is demultiplexed at block 456, which outputs certain information to the resequencing buffer RS at block 458 and the retransmission buffer RT at block 460. In particular, the sequence numbers {$h_{rs}$, $r_{rs}$, $d_{rs}$} are stripped out and sent to the RT to update the retransmission state. For non-idle frames (for instance, where id=0), the frame data (frame length (l) and a frame data field (d)) and the sequence number SN are transmitted to the RS.

Example Processes

The ARQ system and techniques described herein controls traffic over the FSOC terminal and enable reliable data transmission through channel outages. ARQ operation includes the following. At the transmitter incoming frames are held in the input buffer IB until requested for transmission. Frames that have been transmitted and may be unresolved are held in the retransmission buffer RT. A frame is considered resolved at the transmitter if it has been transmitted and acknowledged (ACK'd). A frame is considered to be unresolved if it has been transmitted but not ACK'd. At the receiver, incoming frames are held in the resequencing buffer RS. The RS infers lost frames from incoming traffic. Frames received in order and which are error free are delivered from the RS buffer to the outgoing Ethernet stream. The state of the RS is transmitted back to the transmitter with return traffic.

Block-Selective ARQ

One approach that can be implemented with the aforementioned configurations is block-selective ARQ. As noted above, it is possible to lose data frames in bursts for various reasons. For instance, there may be a pointing error in which the optical link is lost. Other causes of received power fluctuations, such as scintillation, coupling losses, and other issues may also contribute to the loss of frames in bursts. To address these problems, block-selective ARQ may be employed. This technique is suitable for fast and slow-fading channels and has lower complexity than conventional Selective-Repeat (SR) and better performance than Go-Back-N (GbN) techniques.

Block-selective ARQ acknowledges variable length blocks of frames in the return stream from the receiver to the transmitter. On the receive side, all received frames are held in the RS. Frames that are received in order and that are error free are then forwarded from the RS to an output buffer OB for insertion into an outgoing Ethernet stream, which may be provided to another communication terminal or to an end user. The processor(s) in conjunction with the RS infers lost frames from the received incoming traffic. The receiver tracks the most advanced received frame h (with respect to the sequence number), the most recent received frame r, and the oldest frame not forwarded (or delivered) d, as shown in FIG. 3.

Figure 5B:
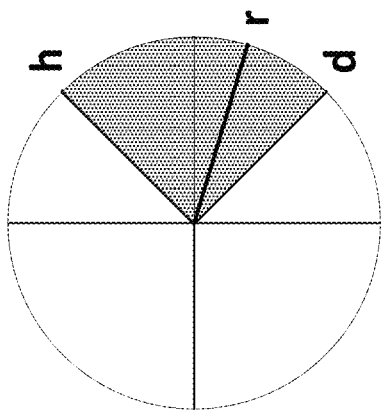
FIGS. 5A-B are pictorial diagrams regarding transmission and reception of frames in accordance with aspects of the disclosure.
Figure 5A:
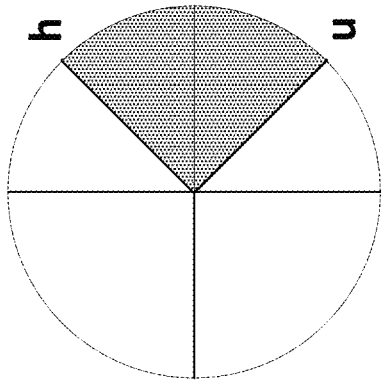

Referring to FIGS. 5A and 5B, these figures pictorially represent how the system may address unacknowledged frames. The first representation 500 (FIG. 5A) illustrates how a first communication device sending frames to a second communication device (e.g., communication devices 302a and 302b, respectively, of FIG. 3) may keep track of various transmitted data frames. Here, h indicates the most advanced transmitted frame, and u indicates the oldest unacknowledged (unresolved) frame. Frames in the shaded region between h and u may be in transit, lost, or acknowledged.

The second representation 510 (FIG. 5B) illustrates how the second communication device may keep track of various received data frames. Here, h indicated the most advanced received frame, d indicates the oldest frame not delivered, and r indicates the most recent received frame based on the information in the resequencing buffer RS of the second communication device. The state of the RS, conveyed by (h,r,d), is sent back to the transmit side with return traffic. This acts as a collection of ACKs to the transmit side. By way of example, the sequence numbers (h,r,d) are embedded in the return data, in particular the header of a frame. If there is no return data, an idle frame is generated and (h,r,d) is embedded in the idle frame. The system may infer a lack of acknowledgement for a particular frame by the absence of an ACK according to the (h,r,d) data, and thereby implement an ARQ process to retransmit the frame.

For instance, each buffer may hold a window of $N_{win}=2048$ frames. The window size is set to accommodate the maximum lost duration. To avoid ambiguity (e.g., one sequence number referring to more than one frame) it is sufficient for the maximum sequence number to be $2N_{win}$. According to one scenario, the maximum sequence number may be $SN_{max}=2^{16}=65536$. The following collection of sequence numbers are used to track the states of the buffers in this example:

| Input Buffer IB | |
|---|---|
| $h_{ib}$ | (head) last frame written |
| $t_{ib}$ | (tail) last frame read |
| Resequencing Buffer RS | |
| $h_{rs}$ | (head) most advanced (with respect to SN) received frame |
| $r_{rs}$ | (received) most recent received frame |
| $d_{rs}$ | (delivered) next frame to be delivered |
| $t_{rs}$ | (tail) $h_{rs} - (N_{win} - 1)$ |
| Retransmission Buffer RT | |
| $h_{rt}$ | (head) most advanced transmitted frame |
| $t_{rt}$ | (tail) $h_{rt} - (N_{win} - 1)$ |
| $u_{rt}$ | the oldest (with respect to SN) unresolved frame |

Because the number of frames in any buffer is always $N_{win}$, it is sufficient to hold the head and compute the tail from the head location in this scenario.

As noted above, the input buffer IB holds frames that have not been transmitted. According to one exemplary scenario, the input buffer is configured as a first-in-first-out queue. Head and tail pointers $h_{ib}$ and $t_{ib}$, as shown above, track the state of the input buffer and wrap modulo the maximum input buffer index. In this scenario, when $h_{ib}=t_{ib}$ the input buffer is empty, and on reset, the system sets $h_{ib}=t_{ib}$. If data is stalled and the buffer fills, frames may be dropped from either the head or the tail of the buffer. Frames may also have a maximum time allowed in the input buffer, e.g., an input-buffer-timeout. Frames that have been in the buffer longer than the input-buffer-timeout are dropped from the queue in this scenario.

In this scenario, the retransmission buffer RT is configured to hold $N_{win}=2048$ frames that have been transmitted and whose status may be unresolved. The two addresses $\{h_{rt}$, $u_{rt}\}$ track the RT buffer state. Frames from $[t_{rt}, u_{rt}-1]$ have been resolved (e.g., delivered or skipped over).

The resequencing buffer RS holds frames that have been received but may not be delivered (e.g., due to being received in error or out-of-order). Also in this scenario, the state of the RS buffer is tracked with the three sequence numbers: $\{h_{rs}, r_{rs}, d_{rs}\}$. Here, $h_{rs}$ is the most advanced frame received, $d_{rs}$ is the next frame to be delivered, and $r_{rs}$ is the most recently received frame. Hence $h_{rs}$ and $r_{rs}$ always point to error-free frames, all frames from $[t_{rs}, d_{rs}-1]$ have been resolved (either delivered or timed out), and $d_{rs}$ points to a frame that has not been received (in the case where the entire window is delivered, $d_{rs}$ points to $h_{rs}+1$). At the RS buffer, frames are delivered once they are received in order. The delivered address $d_{rs}$ is advanced to point to the next frame to be delivered.

On the transmit side, the system uses the received RS state information and tracks the most advanced transmitted frame (h) and the oldest unresolved (un-ACK'd) frame (u), as seen in FIG. 5A. The transmitter is configured to transmit the oldest unacknowledged frame that is not currently in transit.

Adaptive Retransmission Delay

Another ARQ technique suitable in FSOC is adaptive retransmission delay. The retransmission delay is the minimum time the transmitter waits before inferring that a frame was lost (and making it a candidate for retransmission). In one scenario, the retransmission delay is nominally set to the round trip time (RTT). However, if the acknowledgement information for a frame is lost the system can erroneously retransmit a frame that was received correctly. This adversely affects the efficiency of the system, because the transmitter expends processing and transmission resources on the retransmission of a properly received frame instead of sending a new frame. To address this situation, the system allows the retransmission delay to grow in the absence of feedback by the receiver, up to some defined limit. Here, on the reception of a valid frame from the receiver, the transmitter will reset the delay.

Figure 6:
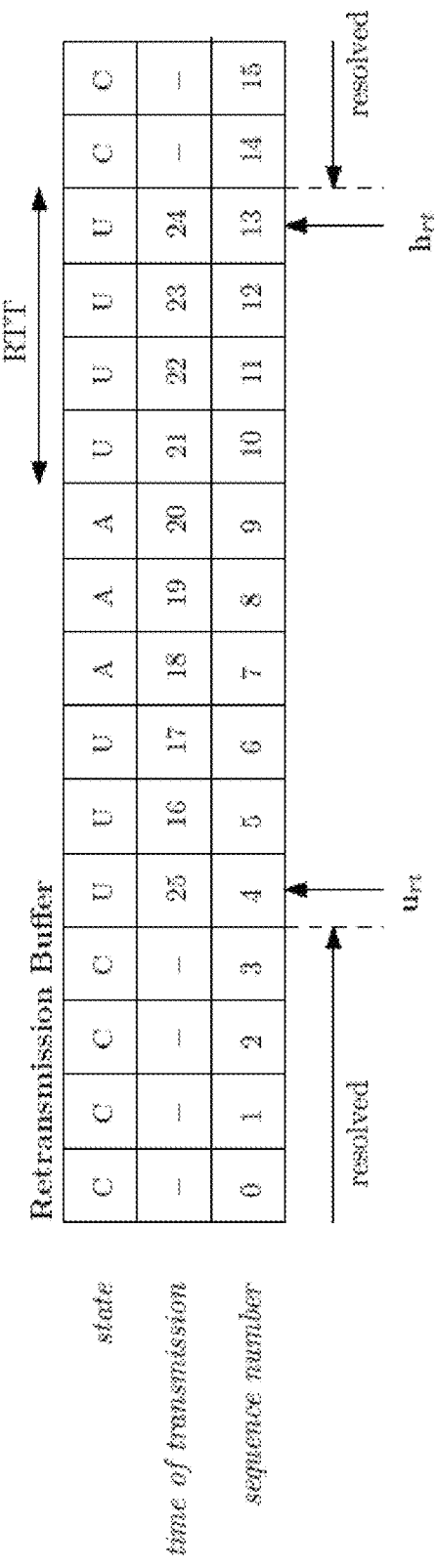
FIG. 6 is an example of a retransmission buffer in accordance with aspects of the disclosure.
Figure 7:
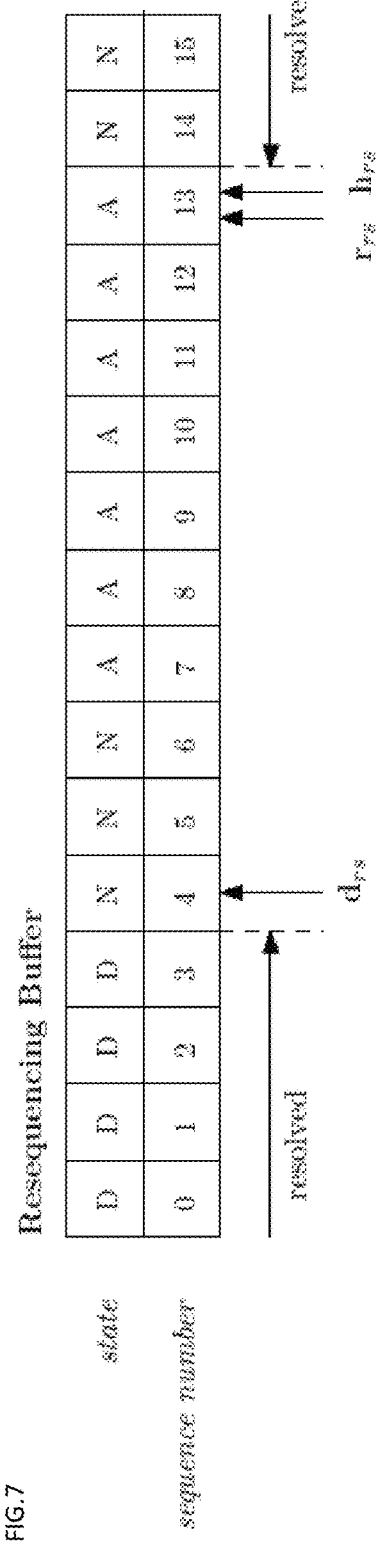
FIG. 7 is an example of a resequencing buffer in accordance with aspects of the disclosure.

Upon transmission, a frame is stored in the RT and the time at which the frame was transmitted ($T_{tmt}$) is recorded, e.g., in that buffer. In one scenario, the RT holds the frame state, sequence number and the $T_{tmt}$. For instance, referring to FIG. 6, the RT buffer may store information as illustrated, where A=acknowledged (i.e., ACK), C=cleared for re-use, and U=unresolved. Here, each column corresponds to a single frame, $h_{rt}$ is the most advanced sequence number transmitted and $u_{rt}$ is the least advanced sequence number that is unresolved. $T_{lost}$ is the lost duration and RTT is the round-trip-time. And referring to FIG. 7, the RS may store information as illustrated where A=received (acknowledged), N=not received, and D=delivered. $h_{rs}$ is the most advanced sequence number received (ACK'd), $r_{rs}$ is the most recent received SN, and $d_{rs}$ is the next SN to be delivered.

In this example, a frame is a candidate for retransmission when the time since the last transmission exceeds the RT parameter $T_{lost}$. $T_{lost}$ is determined according to the equation:

$$T_{lost}(t)=\min\{RTT+(t-t'),T_{lost,max}\}$$

Here, t is the current time, t' is the time at which the last feedback frame (ACK) was correctly received, and RTT is the round trip time. Upon determination that $T_{lost}$ has been exceeded, the processing system of the transmitter may determine to retransmit the selected frame. In one scenario, the typical RTT is between 0-1.3 ms, and $T_{lost}$ may be between the RTT and 10 ms. In other FSOC scenarios, the RTT may exceed 1.3 ms, for instance being between 1.0 ms and 5 ms, or less than 10 ms. And $T_{lost}$ may similarly exceed 10 ms, for instance being between 10-25 ms, or less than 40 ms. Other FSOC situations may have even larger (or smaller) RTT and $T_{lost}$ times.

More simply, the time to wait (t)=RTT+δ, where δ is the time that the return traffic (e.g., acknowledgements) has been down or otherwise not received correctly. This approach helps to reduce false retransmissions due to an unreliable feedback channel.

When a new frame is received from the other device, the RT buffer is updated. In one example, the lost duration may first be set to the minimum value RTT (which is thought of as including processing delay). Frames having addresses falling outside the transmitter window (based on the values $\{h_{rs}, r_{rs}, d_{rs}\}$) are ignored. When the oldest (with respect to sequence number) unresolved frame is acknowledged, the window for frames under consideration advances.

The system in addition has a timeout $T_{out}$. frames that have been in the RT longer than $T_{out}$ are no longer candidates for re-transmission. According to aspects of the disclosure, when a frame has been in the RT longer than $T_{out}$ its state is changed from U (unacknowledged) or A (acknowledged) to C (cleared for reuse). There are a number of ways to accommodate this at the RS buffer. In one example, the $N_{win}$ window is much smaller than the number of valid sequence numbers. When the RT times out a frame, it allows the transmission of frames with sequence numbers that cause the $h_{rs}$ pointer to advance beyond the window of sequence numbers in $[h_{rs}, d_{rs}]$. When the RS receives such a sequence number, it advances its window to accommodate the new frame. This may cause it to advance the $d_{rs}$ pointer, in which case it resets the states of all frames that $d_{rs}$ advances over to D (delivered). In this way the RS buffer does not hang up on a frame that the RT is no longer transmitting.

It is also possible to set a quality of service based on traffic requests or other demands. Here, the system may take this information into account to have the timeout occur more quickly, or possibly never time out. For example, latency constrained traffic can have a timeout of zero, so they are never retransmitted.

Randomly Seeded Scrambling

Another ARQ technique in accordance with aspects of the disclosure involves random seed scrambling. In some digital communications systems a line code may be used to avoid long runs of 1s or 0s in the data, and also to ensure that the data is DC balanced. The line code helps the system with clock and data recovery. A digital communication system also requires a method to locate the start and end of a frame. This can be facilitated by embedding in the data sequence a special frame sync (FS) sequence. The line code may also be designed to prohibit the occurrence of the FS in the data. But the line code also introduces overhead, coding complexity and error propagation in decoding. These can significantly affect performance of the communication system. In order to avoid such issues, a scrambling sequence may be used instead of a line code. With a scrambling sequence the data is combined with the scrambling sequence, for example by modulo-two addition of bits, so that the data is more likely to appear random.

Figure 8:
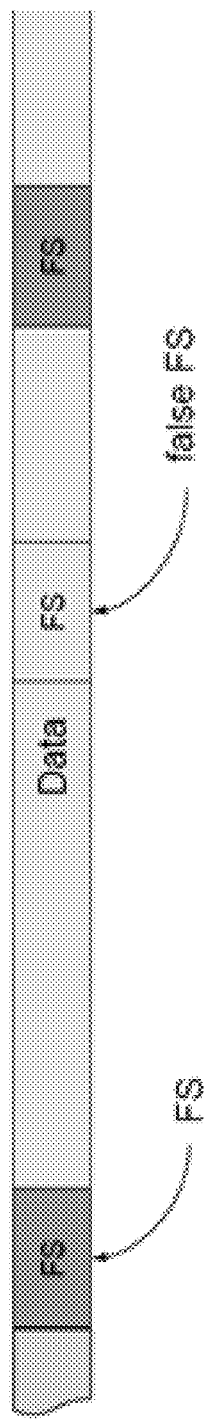
FIG. 8 is illustrates the possibility of a false frame synchronization scenario.

The scrambling sequence, which has a rate one, still allows for the possibility that a sync appears in the data (or a problematic run of is or 0s). Referring to FIG. 8, this is shown regarding a false (e.g., duplicate) frame sync (FS). When a false FS appears, the receiver may inaccurately lock to it and the frame will be lost. The false FS problem is addressed here by using a different seed for the scrambling sequence when a frame is retransmitted. Thus, should the frame be lost and need to be retransmitted, it will have a different scrambling sequence applied to it. It is highly unlikely a false FS will appear when the data is scrambled with the different sequence. As discussed above, the scrambling seed is embedded within the frame for recovery by the receiver. Referring back to FIG. 4A, this is shown in which the scrambling sequence or seed (r) from the scrambler 420 is applied to the frame to be transmitted prior to application of the error correction code.

Figure 9:
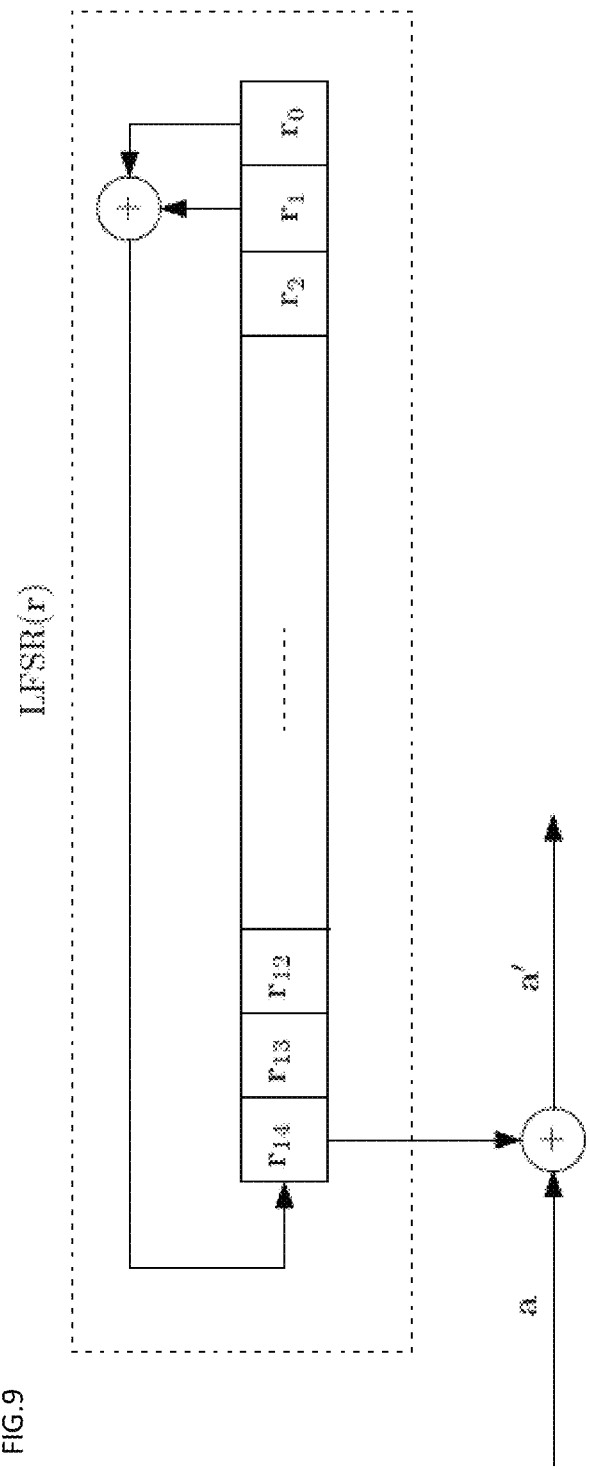
FIG. 9 illustrates a linear feedback shift register scrambler in accordance with aspects of the disclosure.

Referring to FIG. 9, this figure illustrates one embodiment of the scrambler 420, in particular using a linear feedback shift register (LFSR). In this case, the scrambling sequence is generated by the LFSR having a particular feedback polynomial. The result is a 2-byte scrambler state (or seed field) prepended to the frame, with the first scrambled bit being the idle field. By way of example only, the feedback polynomial may be: $z^{15}+z^1+z^0$. Other feedback polynomials can also be employed. Also, because the LFSR state changes at every iteration, the scrambler sequence changes accordingly from one frame to a subsequent frame.

After scrambling, the ECC is applied and the data block is transmitted to the receiver, for instance as described above with regard to node 422 of FIG. 4A. Upon receipt of the frame, after error correction and detection is performed according to the ECC, the scrambling seed r is extracted as shown in FIG. 4C and is used to initialize the descrambler. When a frame needs to be retransmitted, the appropriate scrambler state is regenerated at that point, as the scrambler state does not need to be stored. With this approach, a line code may be omitted, resulting in reduced overhead, coding simplification and avoidance of error propagation in decoding.

Example Methods

Figure 10:
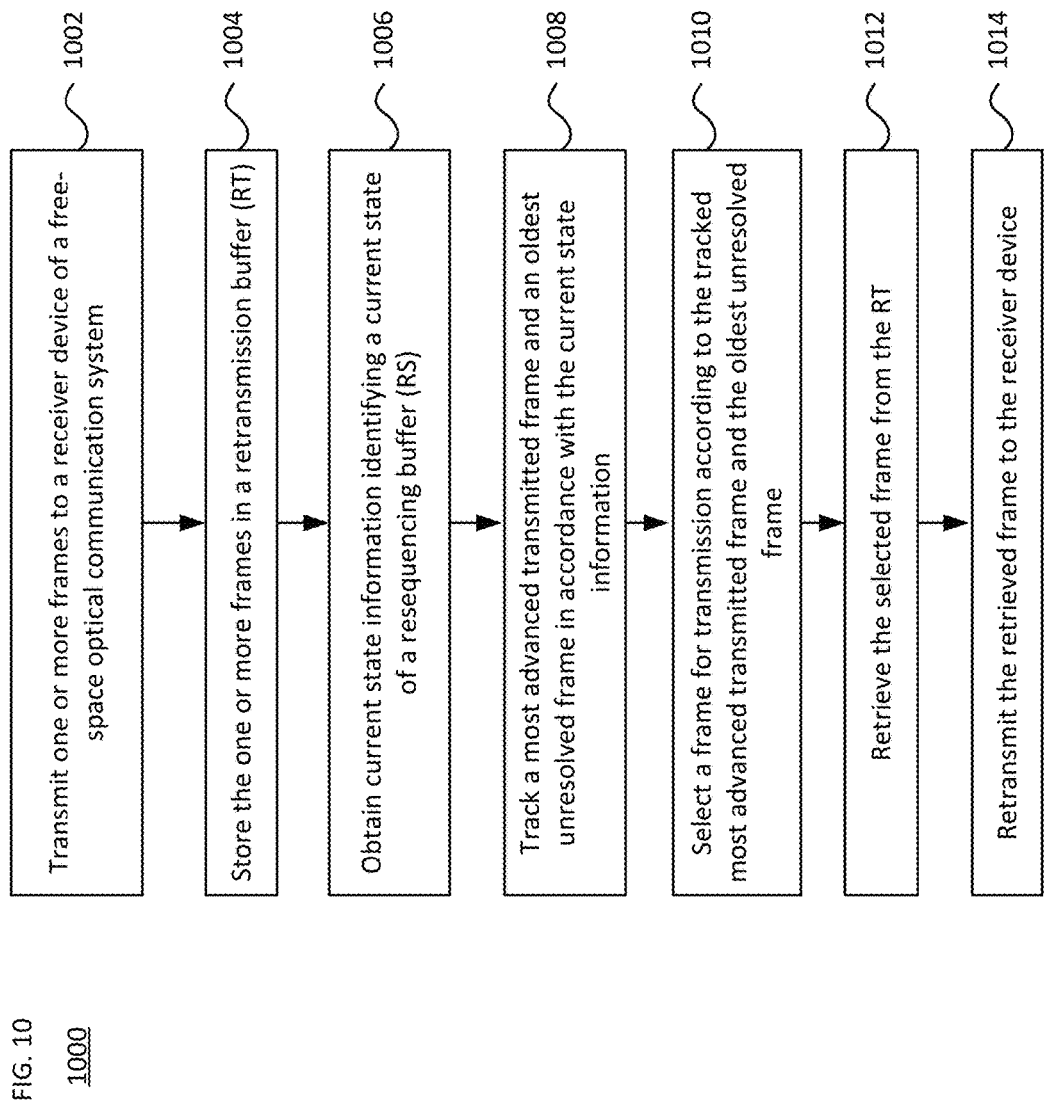
FIG. 10 is an example flow diagram in accordance with aspects of the disclosure.
Figure 11:
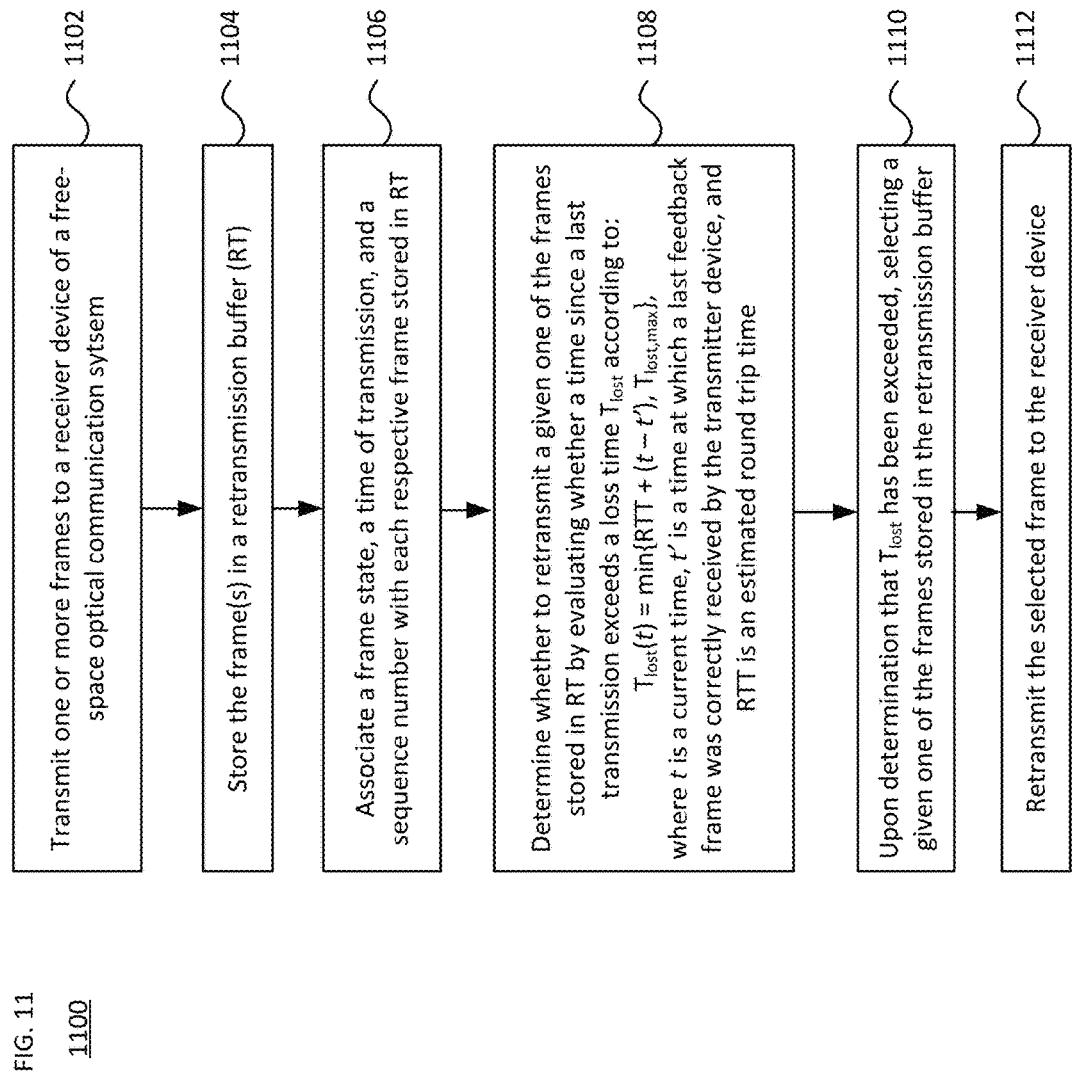
FIG. 11 is another example flow diagram in accordance with aspects of the disclosure.
Figure 12:
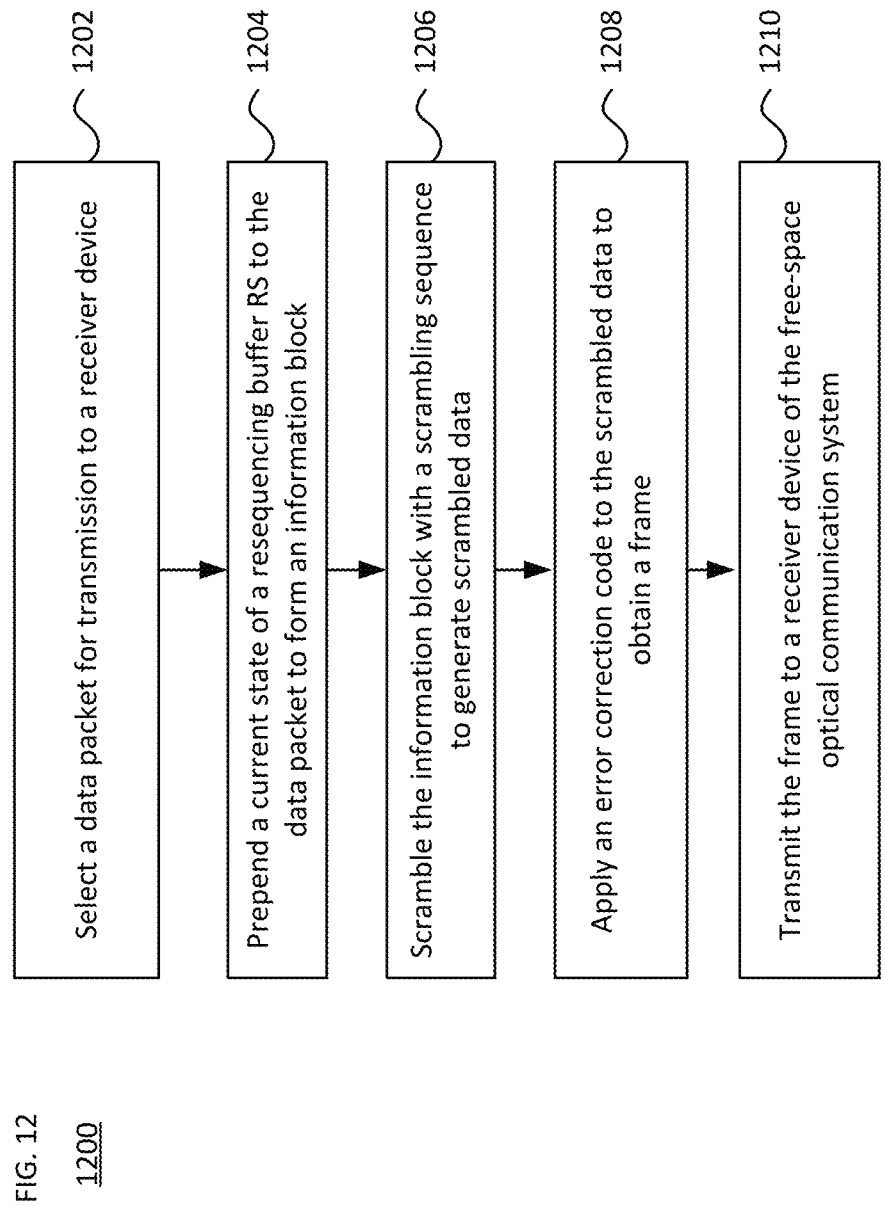
FIG. 12 is a further example flow diagram in accordance with aspects of the disclosure.

Referring to FIGS. 10-12, these figures provide example flow diagrams of the processes described above. For instance, FIG. 10 illustrates process 1000, which involves transmitting one or more frames to a receiver device of a free-space optical communication system in block 1002. The frame(s) is stored in a retransmission buffer at block 1004, and in block 1006 the system obtains current state information identifying a current state of a resequencing buffer. In block 1008, the process tracks a most advanced transmitted frame and an oldest unresolved frame in accordance with the current state information. Then in block 1010, the system selects a frame for transmission according to the tracked most advanced transmitted frame and the oldest unresolved fame. In block 1012 the frame of interest is retrieved from the retransmission buffer, and in block 1014 the retrieved frame is transmitted to the receiver device using FSOC.

Referring to FIG. 11, this figure illustrates process 1100, in which one or more frames are transmitted to a receiver device of a free-space optical communication system in block 1102. In block 1104 the frame(s) is stored in a retransmission buffer. As shown in block 1106, a frame state, time of transmission and sequence number are associated with each respective frame stored in the retransmission buffer. In block 1108, the system determines whether to retransmit a given frame stored in the retransmission buffer by evaluating whether a time since a last transmission exceeds a loss time ($T_{lost}$). This is done according to the equation:

$$T_{lost}(t)=\min\{RTT+(t-t'),T_{lost,max}\}$$

where t is a current time, t' is a time at which a last feedback frame was correctly received by the transmitter device, and RTT is an estimated round trip time. In block 1110, upon determination that $T_{lost}$ has been exceeded, the system selects a given one of the frames stored in the retransmission buffer, and in block 1112 the system retransmits the selected frame to the receiver device.

Referring to FIG. 12, this figure illustrates process 1200, which involves selecting a data frame for transmission to a receiver device per block 1202. The system prepends a current state of a resequencing buffer to the data frame to form an information block in block 1204, and scrambles the information block with a scrambling sequence to generate scrambled data in block 1206. Then in block 1208 the system applies an error correction code to the scrambled data to obtain a frame, and in block 1210 transmits the frame to a receiver device of the free-space optical communication system.

The features described above may provide efficient approaches to handle ARQ retransmissions of frames between two communication devices in a FSOC system. These techniques reduce system overhead and processing costs, and ensure more reliable transmission and reception of information. The various techniques can be used individually or in any combination, resulting in a robust communication architecture that can handle slow fading and other burst frame loss situations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An automatic repeat request (ARQ) method for use in a free-space optical communication system, the method comprising:
   transmitting, by a transmitter device, one or more frames to a receiver device of the free-space optical communication system;
   storing, upon transmission, the one or more frames in a retransmission buffer;
   associating a frame state, a time of transmission, and a sequence number with each respective frame stored in the retransmission buffer;
   determining, by the transmitter device, whether to retransmit a given one of the one or more frames stored in the retransmission buffer by evaluating whether a time since a last transmission exceeds a loss time $T_{lost}$ according to the equation:

$T_{lost}(t) = \min\{RTT+(t-t'), T_{lost,max}\}$ where t is a current time, t' is a time at which a last feedback frame was correctly received by the transmitter device, and RTT is an estimated round trip time;
   upon determination that $T_{lost}$ has been exceeded, selecting a given one of the frames stored in the retransmission buffer; and
   retransmitting the selected frame to the receiver device.

2. The ARQ method of claim 1, wherein selection of the given frame is performed according to at least one of the frame state, the time of transmission and the sequence number.

3. The ARQ method of claim 1, wherein selection of the given frame is limited to unresolved frames stored within the retransmission buffer.

4. The ARQ method of claim 1, wherein the unresolved frames are limited to frames between an oldest unresolved frame and a most advanced transmitted frame.

5. The ARQ method of claim 1, wherein the RTT is no greater than 2.0 ms.

6. The ARQ method of claim 1, wherein $T_{lost}$ is between the RTT and 20 ms.

7. An automatic repeat request (ARQ) communication device, comprising:
   an optics system configured to communicate with another communication device using free space optical communication (FSOC);
   a transmitter device operatively coupled to the optics system, the transmitter device being configured to assemble frames to be sent via FSOC by the optics system to the other communication device;
   a receiver device operatively coupled to the optics system, the receiver device being configured to disassemble frames received by the optics system from the other communication device;
   memory including an input buffer (IB), a retransmission buffer (RT) and a resequencing buffer (RS);
   one or more processors operatively coupled to the memory, the transmitter device, the receiver device and the optics system, the one or more processors being configured to select frame data from the IB or the RT and provide the selected frame data to the transmitter device to assemble into one or more frames;
   wherein a set of previously transmitted frames is stored in the RT, and the one or more processors are further configured to:
   track current state information of the set of previously transmitted frames;
   determine whether the current state information satisfied a threshold condition; and
   when the current state information satisfies the threshold condition, retrieve a particular set of frame data from the RT, provide the particular set of frame data to the transmitter device, and to cause the optics system to transmit a frame corresponding to the particular set of frame data to the other communication device;
   wherein the current state information includes either a status of a resequencing buffer of the other communication device or a loss time $T_{lost}$; and
   wherein the one or more processors are configured to determine whether the current state information satisfied the threshold condition by evaluating whether a time since a last transmission exceeds the loss time $T_{lost}$ according to the equation:

$T_{lost}(t) = \min\{RTT+(t-t'), T_{lost\ max}\}$ where t is a current time, t' is a time at which a last feedback frame was correctly received by the transmitter device, and RTT is an estimated round trip time.

8. The ARQ communication device of claim 7, wherein the ARQ communication device is further configured to:
   track a most advanced transmitted frame and an oldest unresolved frame in accordance with the current state information; and retrieve the particular set of frame data from the RT according to the tracked most advanced transmitted frame and the oldest unresolved frame.

9. The ARQ communication device of claim 7, wherein the transmitter device is further configured to apply a scrambling sequence to the selected frame data during frame assembly.

10. The ARQ communication device of claim 9, wherein the transmitter device is configured to apply the scrambling sequence by:
  prepending a current state of a given resequencing buffer to the selected frame data to form an information block;
  scramble the information block with the scrambling sequence to generate scrambled data; and
  applying an error correction code to the scrambled data to obtain scrambled frame.

* * * * *